United States Patent
Wang et al.

(10) Patent No.: US 12,242,730 B2
(45) Date of Patent: Mar. 4, 2025

(54) DATA ARRANGEMENT METHOD BASED ON FILE SYSTEM, MEMORY STORAGE DEVICE AND MEMORY CONTROL CIRCUIT UNIT

(71) Applicant: Hefei Core Storage Electronic Limited, Anhui (CN)

(72) Inventors: Chih-Ling Wang, Anhui (CN); Yin Ping Gao, Anhui (CN); Qi-Ao Zhu, Anhui (CN); Kuai Cao, Anhui (CN); Dong Sheng Rao, Anhui (CN)

(73) Assignee: Hefei Core Storage Electronic Limited, Anhui (CN)

( * ) Notice: Subject to any disclaimer, the term of this patent is extended or adjusted under 35 U.S.C. 154(b) by 130 days.

(21) Appl. No.: 18/190,055

(22) Filed: Mar. 24, 2023

(65) Prior Publication Data
US 2024/0289022 A1     Aug. 29, 2024

(30) Foreign Application Priority Data
Feb. 24, 2023  (CN) .......................... 202310182105.2

(51) Int. Cl.
*G06F 3/06* (2006.01)
(52) U.S. Cl.
CPC .......... *G06F 3/0613* (2013.01); *G06F 3/0659* (2013.01); *G06F 3/0679* (2013.01)
(58) Field of Classification Search
CPC ...... G06F 3/061; G06F 3/0613; G06F 3/0643; G06F 3/0659; G06F 3/0679
See application file for complete search history.

(56) References Cited

U.S. PATENT DOCUMENTS

| | | |
|---|---|---|
| 2013/0054494 A1 | 2/2013 | Haber et al. |
| 2014/0241033 A1 | 8/2014 | Gaertner et al. |

FOREIGN PATENT DOCUMENTS

| | | |
|---|---|---|
| CN | 106033681 | 10/2016 |
| CN | 108664350 | 10/2018 |
| CN | 113312274 | 8/2021 |

OTHER PUBLICATIONS

"Office Action of Taiwan Counterpart Application", issued on Jun. 4, 2024, p. 1-p. 11.

*Primary Examiner* — Yong J Choe
(74) *Attorney, Agent, or Firm* — JCIPRNET (57) ABSTRACT

A data arrangement method based on file system, a memory storage device and a memory control circuit unit are disclosed. The method includes: analyzing a file system stored in a system region to obtain a plurality of first logical units to which a first file belongs and first distribution information of a plurality of first physical units in a storage region, wherein the first physical units are mapped by the first logical units; determining whether to activate a data arrangement operation on the first file according to the first distribution information; after the data arrangement operation on the first file is activated, reading first data belonging to the first file from the first physical units; and writing, sequentially, the read first data to at least one second physical unit in the storage region.

21 Claims, 7 Drawing Sheets

DATA ARRANGEMENT METHOD BASED ON FILE SYSTEM, MEMORY STORAGE DEVICE AND MEMORY CONTROL CIRCUIT UNIT

CROSS-REFERENCE TO RELATED APPLICATION

This application claims the priority benefit of China application serial no. 202310182105.2, filed on Feb. 24, 2023. The entirety of the above-mentioned patent application is hereby incorporated by reference herein and made a part of this specification.

BACKGROUND

Technical Field

The disclosure relates to a memory management technology, and particularly relates to a data arrangement method based on file system, a memory storage device and a memory control circuit unit.

Description of Related Art

Smart phones, tablet computers and personal computers have grown rapidly in recent years, which has led to a rapid increase in consumers' demand for storage media. Since a rewritable non-volatile memory module (for example, a flash memory) has characteristics of non-volatility of data, power saving, small size, no mechanical structure, etc., it is very suitable for being built in various portable multimedia devices as mentioned above.

Conventionally, a memory controller may perform a garbage collection operation on the rewritable non-volatile memory module to collectively store valid data and release more available space. However, the normal garbage collection operation does not consider whether data belongs to a same file in a file system. Therefore, after the garbage collection operation is performed, a reading performance of multiple data segments belonging to the same file may not be increased, and even the subsequent data reading performance of multiple data segments belonging to the same file may be reduced due to that the data has been moved by multiple times.

SUMMARY

The disclosure is directed to a data arrangement method based on file system, a memory storage device and a memory control circuit unit, which are adapted to improve a data reading performance.

An exemplary embodiment of the disclosure provides a data arrangement method based on file system, which is adapted to a rewritable non-volatile memory module. The rewritable non-volatile memory module includes a system region and a storage region. The data arrangement method includes: analyzing a file system stored in the system region to obtain multiple first logical units to which a first file belongs and first distribution information of multiple first physical units in the storage region, wherein the first physical units are mapped by the first logical units; determining whether to activate a data arrangement operation on the first file according to the first distribution information; reading first data belonging to the first file from the first physical units after the data arrangement operation on the first file is activated; and sequentially writing the read first data to at least one second physical unit in the storage region.

An exemplary embodiment of the disclosure further provides a memory storage device including a connection interface unit, a rewritable non-volatile memory module, and a memory control circuit unit. The connection interface unit is configured to couple to a host system. The rewritable non-volatile memory module includes a system region and a storage region. The memory control circuit unit is coupled to the connection interface unit and the rewritable non-volatile memory module. The memory control circuit unit is used for: analyzing a file system stored in the system region to obtain multiple first logical units to which a first file belongs and first distribution information of multiple first physical units in the storage region, wherein the first physical units are mapped by the first logical units; determining whether to activate a data arrangement operation on the first file according to the first distribution information; reading first data belonging to the first file from the first physical units after the data arrangement operation on the first file is activated; and sequentially writing the read first data to at least one second physical unit in the storage region.

An exemplary embodiment of the disclosure further provides a memory control circuit unit for controlling a rewritable non-volatile memory module. The rewritable non-volatile memory module includes a system region and a storage region. The memory control circuit unit includes a host interface, a memory interface and a memory management circuit. The host interface is configured to couple to a host system. The memory interface is configured to couple to the rewritable non-volatile memory module. The memory management circuit is coupled to the host interface and the memory interface. The memory management circuit is used for: analyzing a file system stored in the system region to obtain multiple first logical units to which a first file belongs and first distribution information of multiple first physical units in the storage region, wherein the first physical units are mapped by the first logical units; determining whether to activate a data arrangement operation on the first file according to the first distribution information; reading first data belonging to the first file from the first physical units after the data arrangement operation on the first file is activated; and sequentially writing the read first data to at least one second physical unit in the storage region.

Based on the above description, by analyzing the file system stored in the system region, the first logical units to which the first file belongs and the first distribution information of the first physical units mapped by the first logical units may be obtained. According to the first distribution information, it is determined whether to activate the data arrangement operation on the first file. After the data arrangement operation on the first file is activated, the first data belonging to the first file may be read from the first physical units and sequentially written into at least one second physical unit. In this way, the subsequent data reading performance to the first file is improved.

DESCRIPTION OF THE EMBODIMENTS

Generally, a memory storage device (which is also referred to as a memory storage system) includes a rewritable non-volatile memory module and a controller (which is also referred to as a control circuit). The memory storage device may be used together with a host system such that the host system may write data to or read data from the memory storage device.

Figure 1:
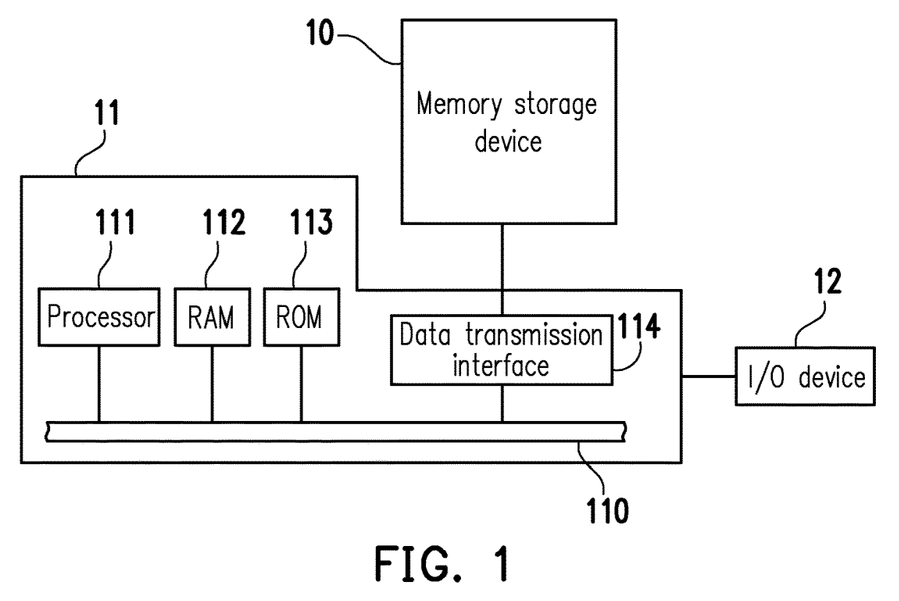
FIG. 1 is a schematic diagram of a host system, a memory storage device and an input/output (I/O) device according to an exemplary embodiment of the disclosure.
Figure 2:
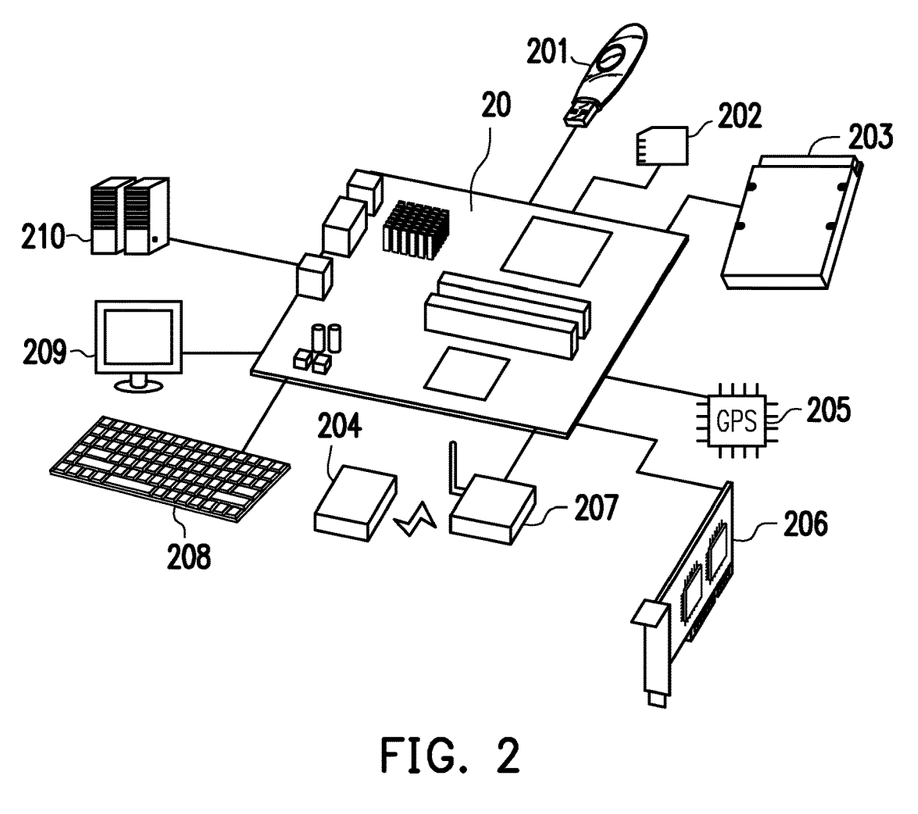
FIG. 2 is a schematic diagram of the host system, the memory storage device and the I/O device according to an exemplary embodiment of the disclosure.

FIG. 1 is a schematic diagram of a host system, a memory storage device and an input/output (I/O) device according to an exemplary embodiment of the disclosure. FIG. 2 is a schematic diagram of the host system, the memory storage device and the I/O device according to an exemplary embodiment of the disclosure.

Referring to FIG. 1 and FIG. 2, a host system 11 may include a processor 111, a random access memory (RAM) 112, a read only memory (ROM) 113 and a data transmission interface 114. The processor 111, the RAM 112, the ROM 113 and the data transmission interface 114 may be coupled to a system bus 110.

In an exemplary embodiment, the host system 11 may be coupled to a memory storage device 10 through the data transmission interface 114. For example, the host system 11 may store data into the memory storage device 10 or read data from the memory storage device 10 through the data transmission interface 114. In addition, the host system 11 may be coupled to an I/O device 12 through the system bus 110. For example, the host system 11 may transmit an output signal to the I/O device 12 or receive an input signal from the I/O device 12 through the system bus 110.

In an exemplary embodiment, the processor 111, the RAM 112, the ROM 113 and the data transmission interface 114 may be disposed on a motherboard 20 of the host system 11. The number of the data transmission interface 114 may be one or plural. Through the data transmission interface 114, the motherboard 20 may be coupled to the memory storage device 10 in a wired or wireless manner.

In an exemplary embodiment, the memory storage device 10 may be, for example, a flash drive 201, a memory card 202, a solid state drive (SSD) 203 or a wireless memory storage device 204. The wireless memory storage device 204 may be, for example, a near field communication (NFC) memory storage device, a wireless fidelity (WiFi) memory storage device, a Bluetooth memory storage device or a low power consumption Bluetooth memory storage device (for example, iBeacon) and other memory storage devices based on various wireless communication technologies. In addition, the motherboard 20 may also be coupled to various I/O devices such as a global positioning system (GPS) module 205, a network interface card 206, a wireless transmission device 207, a keyboard 208, a screen 209, a speaker 210, etc., through the system bus 110. For example, in an exemplary embodiment, the motherboard 20 may access the wireless memory storage device 204 through the wireless transmission device 207.

In an exemplary embodiment, the host system 11 is a computer system. In an exemplary embodiment, the host system 11 may be any system that may substantially cooperate with the memory storage device to store data. In an exemplary embodiment, the memory storage device 10 and the host system 11 may respectively include a memory storage device 30 and a host system 31 of FIG. 3.

Figure 3:
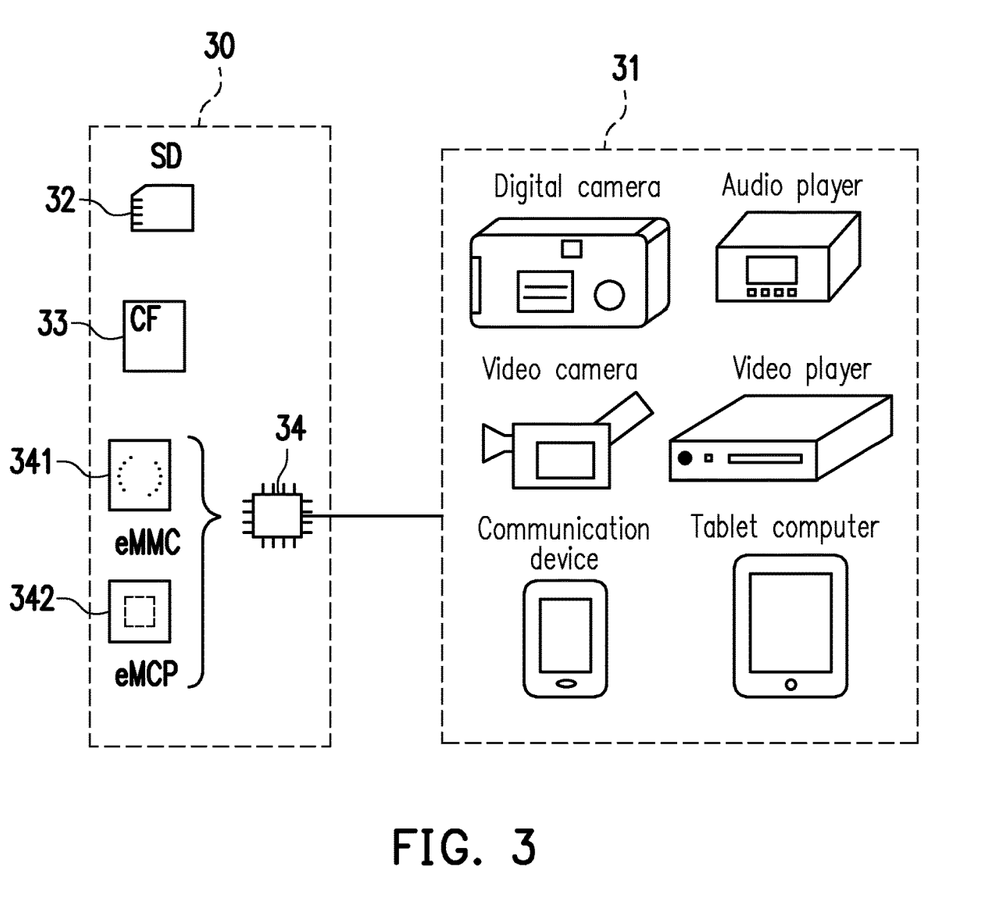
FIG. 3 is a schematic diagram of a host system and a memory storage device according to an exemplary embodiment of the disclosure.

FIG. 3 is a schematic diagram of a host system and a memory storage device according to an exemplary embodiment of the disclosure. Referring to FIG. 3, the memory storage device 30 may be used together with the host system 31 to store data. For example, the host system 31 may be a digital camera, a video camera, a communication device, an audio player, a video player, or a tablet computer. For example, the memory storage device 30 may be various non-volatile memory storage devices such as a secure digital (SD) card 32, a compact flash (CF) card 33, or an embedded storage device 34 used by the host system 31. The embedded storage device 34 includes an embedded multimedia card (eMMC) 341 and/or an embedded multi chip package (eMCP) storage device 342, and other types of embedded storage devices that directly connect the memory module to a base plate of the host system.

Figure 4:
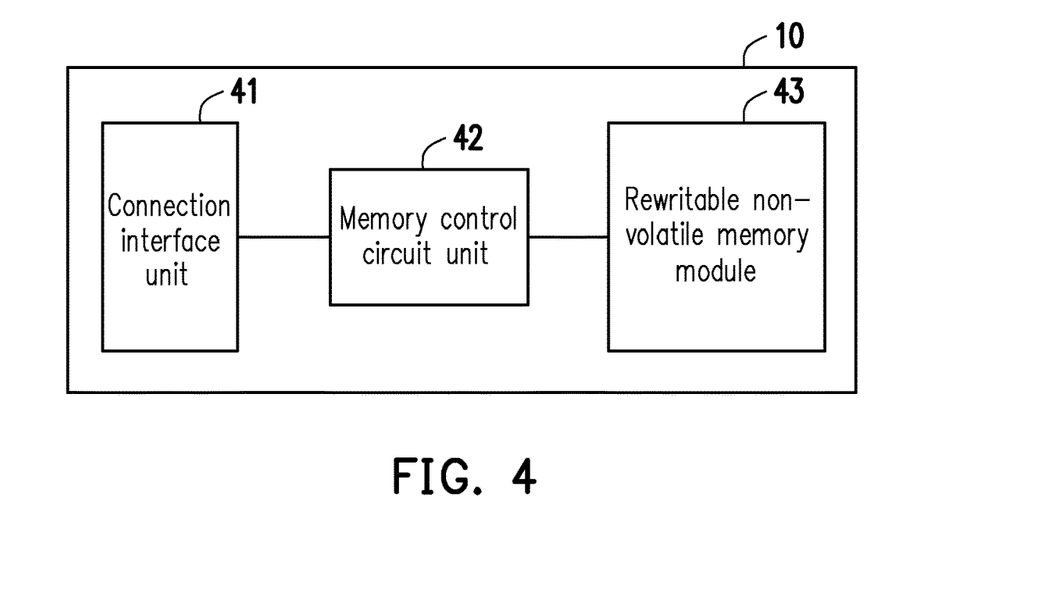
FIG. 4 is a schematic diagram of a memory storage device according to an exemplary embodiment of the disclosure.

FIG. 4 is a schematic diagram of a memory storage device according to an exemplary embodiment of the disclosure. Referring to FIG. 4, the memory storage device 10 includes a connection interface unit 41, a memory control circuit unit 42 and a rewritable non-volatile memory module 43.

The connection interface unit 41 is used to couple the memory storage device 10 to the host system 11. The memory storage device 10 may communicate with the host system 11 through the connection interface unit 41. In an exemplary embodiment, the connection interface unit 41 is compatible to a peripheral component interconnect express (PCI Express) standard. In an exemplary embodiment, the connection interface unit 41 may also be compatible to a serial advanced technology attachment (SATA) standard, a parallel advanced technology attachment (PATA) standard, an institute of electrical and electronic engineers (IEEE) 1394 standard, a universal serial bus (USB) standard, an SD interface standard, an ultra high speed-I (UHS-I) interface standard, an ultra high speed II (UHS-II) interface standard, a memory stick (MS) interface standard, an MCP interface standard, an MMC interface standard, an eMMC interface standard, a universal flash storage (UFS) interface standard, an eMCP interface standard, a CF interface standard, an integrated device electronics (IDE) standard, or other suitable standards. The connection interface unit 41 and the memory control circuit unit 42 may be packaged in a chip with the memory control circuit unit 42, or the connection interface unit 41 is arranged outside a chip containing the memory control circuit unit 42.

The memory control circuit unit 42 is coupled to the connection interface unit 41 and the rewritable non-volatile memory module 43. The memory control circuit unit 42 is used to execute multiple logic gates or control instructions implemented in the form of hardware or firmware and perform data reading, writing, erasing operations on the rewritable non-volatile memory module 43 according to the instructions of the host system 11.

The rewritable non-volatile memory module 43 is used to store the data written by the host system 11. The rewritable non-volatile memory module 43 may include a single level cell (SLC) NAND flash memory module (i.e., a flash memory module that one memory cell may store 1 bit), a multi level cell (MLC) NAND flash memory module (i.e., a flash memory module that one memory cell may store 2 bits), a triple level cell (TLC) NAND flash memory module (i.e., a flash memory module that one memory cell may store 3 bits), a quad level cell (QLC) NAND flash memory module (i.e., a flash memory module that one memory cell may store 4 bits), other flash memory modules, or other memory modules with the same characteristics.

Each memory cell in the rewritable non-volatile memory module 43 stores one or more bits by changing a voltage (which is also referred to as a threshold voltage hereinafter). Specifically, there is a charge trapping layer between a control gate and a channel of each memory cell. By applying a writing voltage to the control gate, an amount of electrons in the charge trapping layer may be changed, thereby changing the threshold voltage of the memory cell. The operation of changing the threshold voltage of the memory cell is also referred to as "writing data into the memory cell" or "programming the memory cell". Along with the change of the threshold voltage, each memory cell in the rewritable non-volatile memory module 43 has multiple storage states. Which storage state a memory cell belongs to may be judged by applying a reading voltage, thereby obtaining one or more bits stored in the memory cell.

In an exemplary embodiment, the memory cells of the rewritable non-volatile memory module 43 may form multiple physical programming units, and these physical programming units may form multiple physical erasing units. Specifically, the memory cells on a same word line may form one or more physical programming units. If each memory cell may store 2 or more bits, the physical programming units on the same word line may be at least classified into lower physical programming units and upper physical programming units. For example, the least significant bit (LSB) of a memory cell belongs to the lower physical programming unit, and the most significant bit (MSB) of a memory cell belongs to the upper physical programming unit. Generally, in the MLC NAND flash memory, a writing speed of the lower physical programming unit is greater than that of the upper physical programming unit, and/or reliability of the lower physical programming unit is higher than that of the upper physical programming unit.

In an exemplary embodiment, physical programming unit is the smallest unit for programming data. Namely, physical programming unit is the smallest unit for writing data. For example, a physical programming unit may be a physical page or a physical sector. If the physical programming unit is a physical page, the physical programming units may include a data bit region and a redundancy bit region. The data bit region includes multiple physical sectors for storing user data, and the redundant bit region is used for storing system data (for example, management data such as error correction codes, etc.). In an exemplary embodiment, the data bit region includes 32 physical sectors, and a size of one physical sector is 512 bytes (byte, B). However, in other exemplary embodiments, the data bit region may also include 8, 16 or more or less physical sectors, and the size of each physical sector may also be larger or smaller. On the other hand, the physical erasing unit is the smallest unit for erasing data. Namely, each physical erasing unit contains the least number of memory cells that are erased all together. For example, the physical erasing unit is a physical block.

Figure 5:
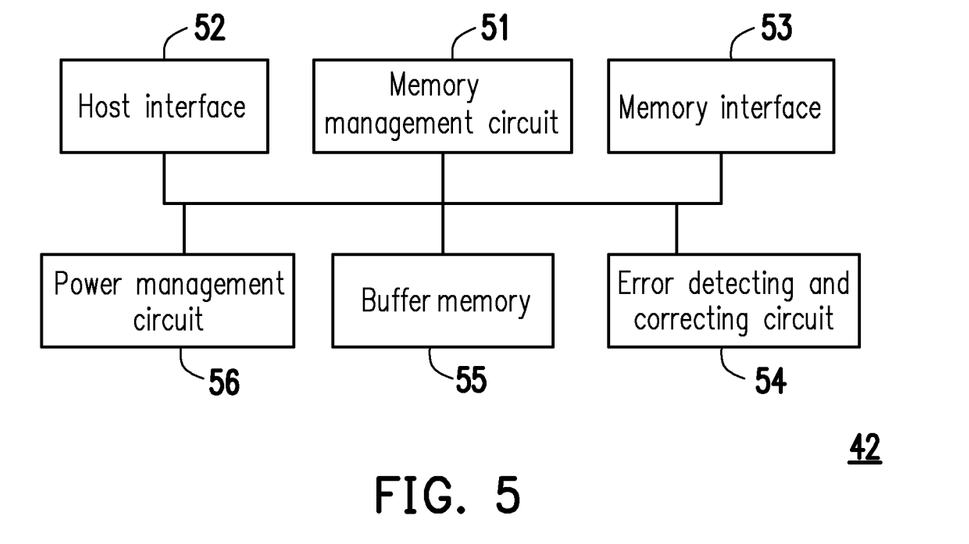
FIG. 5 is a schematic diagram of a memory control circuit unit according to an exemplary embodiment of the disclosure.

FIG. 5 is a schematic diagram of a memory control circuit unit according to an exemplary embodiment of the disclosure. Referring to FIG. 5, the memory control circuit unit 42 includes a memory management circuit 51, a host interface 52 and a memory interface 53.

The memory management circuit 51 is used to control an overall operation of the memory control circuit unit 42. Specifically, the memory management circuit 51 has multiple control instructions, and when the memory storage device 10 is operating, these control instructions are executed to perform data writing, reading and erasing operations. When describing the operation of the memory management circuit 51 below, it is equivalent to describing the operation of the memory control circuit unit 42.

In an exemplary embodiment, the control instructions of the memory management circuit 51 are implemented in a firmware form. For example, the memory management circuit 51 has a microprocessor unit (not shown) and a read-only memory (not shown), and these control instructions are burned into the read-only memory. When the memory storage device 10 is in operation, these control instructions are executed by the microprocessor unit to perform data writing, reading, and erasing operations.

In an exemplary embodiment, the control instructions of the memory management circuit 51 may also be stored in a specific region of the rewritable non-volatile memory module 43 (for example, the system region in the memory module dedicated to store system data). In addition, the memory management circuit 51 has a microprocessor unit (not shown), a ROM (not shown) and a RAM (not shown). In particular, the ROM has a boot code, and when the memory control circuit unit 42 is enabled, the microprocessor unit may first execute the boot code to load the control instructions stored in the rewritable non-volatile memory module 43 into the RAM of the memory management circuit 51. Thereafter, the microprocessor unit executes these control instructions to perform data writing, reading and erasing data operations.

In an exemplary embodiment, the control instructions of the memory management circuit 51 may also be implemented in a hardware form. For example, the memory management circuit 51 includes a microcontroller, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microcontroller. The memory cell management circuit is configured to manage memory cells or memory cell groups of the rewritable non-volatile memory module 43. The memory writing circuit is configured to issue a writing instruction sequence to the rewritable non-volatile memory module 43 to write data into the rewritable non-volatile memory module 43. The memory reading circuit is configured to issue a reading instruction sequence to the rewritable non-volatile memory module 43 to read data from the rewritable non-volatile memory module 43. The memory erasing circuit is configured to issue an erasing instruction sequence to the rewritable non-volatile memory module 43 to erase data from the rewritable non-volatile memory module 43. The data processing circuit is configured to process data to be written into the rewritable non-volatile memory module 43 and data read from the rewritable non-volatile memory module 43. The writing instruction sequence, the reading instruction sequence and the erasing instruction sequence may respectively include one or multiple program codes or instruction codes and are configured to instruct the rewritable non-volatile memory module 43 to perform corresponding writing, reading and erasing operations. In an exemplary embodiment, the memory management circuit 51 may also issue other types of instruction sequences to the rewritable non-volatile memory module 43 to instruct the same to execute corresponding operations.

The host interface 52 is coupled to the memory management circuit 51. The memory management circuit 51 may communicate with the host system 11 through the host interface 52. The host interface 52 may be used to receive and identify instructions and data sent by the host system 11. For example, the instructions and data sent by the host system 11 may be transmitted to the memory management circuit 51 through the host interface 52. In addition, the memory management circuit 51 may transmit data to the host system 11 through the host interface 52. In the exemplary embodiment, the host interface 52 is compatible with the PCI express standard. However, it must be understood that the disclosure is not limited thereto, and the host interface 52 may also be compatible with the SATA standard, the PATA standard, the IEEE 1394 standard, the USB standard, the SD standard, the UHS-I standard, the UHS-II standard, the MS standard, the MMC standard, the eMMC standard, the UFS standard, the CF standard, the IDE standard or other suitable data transmission standards.

The memory interface 53 is coupled to the memory management circuit 51 and is configured to access the rewritable non-volatile memory module 43. For example, the memory management circuit 51 may access the rewritable non-volatile memory module 43 through the memory interface 53. Namely, the data to be written into the rewritable non-volatile memory module 43 may be converted into a format acceptable to the rewritable non-volatile memory module 43 through the memory interface 53. Specifically, if the memory management circuit 51 wants to access the rewritable non-volatile memory module 43, the memory interface 53 transmits the corresponding instruction sequences. For example, these instruction sequences may include a writing instruction sequence instructing to write data, a reading instruction sequence instructing to read data, an erasing instruction sequence instructing to erase data, and the corresponding instruction sequences instructing various memory operations (for example, changing a reading voltage level or performing a garbage collection operation, etc.). These instruction sequences are, for example, generated by the memory management circuit 51 and sent to the rewritable non-volatile memory module 43 through the memory interface 53. These instruction sequences may include one or multiple signals, or data on the bus. These signals or data may include instruction codes or program codes. For example, in a reading instruction sequence, information such as a reading identification code and a memory address may be included.

In an exemplary embodiment, the memory control circuit unit 42 further includes an error detecting and correcting circuit 54, a buffer memory 55 and a power management circuit 56.

The error detecting and correcting circuit 54 is coupled to the memory management circuit 51 and configured to perform error detecting and correcting operations to ensure correctness of data. To be specific, when the memory management circuit 51 receives a writing instruction from the host system 11, the error detecting and correcting circuit 54 may generate a corresponding error correcting code (ECC) and/or an error detecting code (EDC) for data corresponding to the writing instruction, and the memory management circuit 51 may write the data corresponding to the writing instruction and the corresponding error correcting code and/or error detecting code into the rewritable non-volatile memory module 43. Thereafter, when the memory management circuit 51 reads data from the rewritable non-volatile memory module 43, it may simultaneously read the error correcting code and/or error detecting code corresponding to the data, and the error detecting and correcting circuit 54 may perform the error detecting and correcting operations on the read data according to the error correcting code and/or error detecting code.

The buffer memory 55 is coupled to the memory management circuit 51 and configured to temporarily store data. The power management circuit 56 is coupled to the memory management circuit 51 and configured to control a power supply of the memory storage device 10.

In an exemplary embodiment, the rewritable non-volatile memory module 43 of FIG. 4 may include a flash memory module. In an exemplary embodiment, the memory control circuit unit 42 of FIG. 4 may include a flash memory controller. In an exemplary embodiment, the memory management circuit 51 of FIG. 5 may include a flash memory management circuit.

Figure 6:
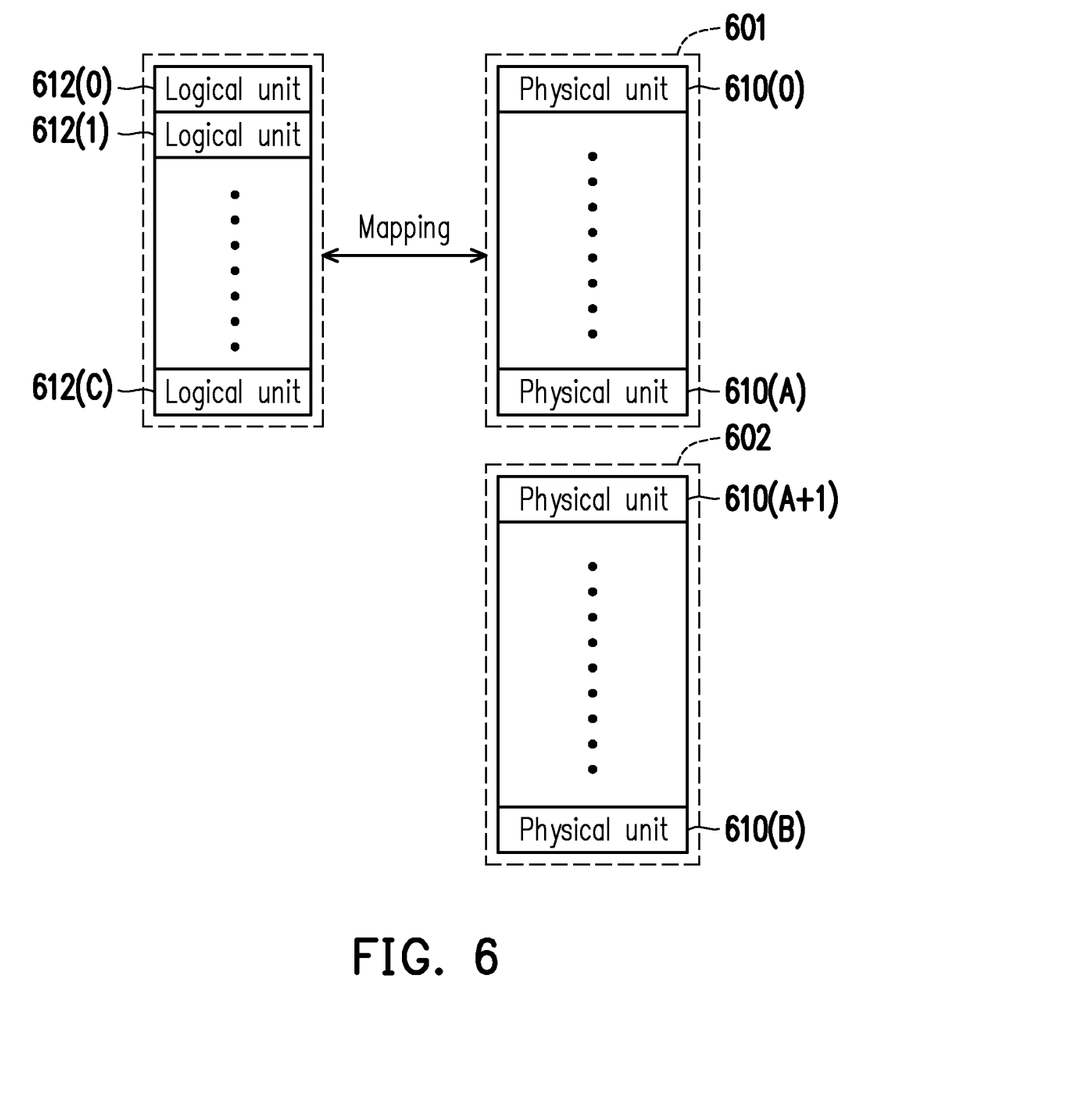
FIG. 6 is a schematic diagram of managing a rewritable non-volatile memory module according to an exemplary embodiment of the disclosure.

FIG. 6 is a schematic diagram of managing a rewritable non-volatile memory module according to an exemplary embodiment of the disclosure. Referring to FIG. 6, the memory management circuit 51 may logically group physical units 610(0)-610(B) in the rewritable non-volatile memory module 43 into a storage region 601 and a system region 602.

In an exemplary embodiment, one physical unit refers to a physical programming unit. One physical programming unit may contain multiple physical nodes. In an exemplary embodiment, one physical node may store data with a data length of 4 KB, and one physical programming unit may include four physical nodes, so that one physical programming unit may store data with a data length of 16 KB. However, in an exemplary embodiment, each physical node may also store more or less data, and/or each physical programming unit may include more or less physical nodes, which are not limited by the disclosure.

The physical units 610(0)-610(A) in the storage region 601 are used to store user information (such as user information from the host system 11 of FIG. 1). For example, the physical units in the storage region 601 may store valid data and/or invalid data. In an exemplary embodiment, if a certain physical unit does not store valid data, this physical unit may be regarded as a spare physical unit and may be erased. When writing new data, one or multiple spare physical units may be extracted to store the new data.

The physical units 610(A+1)-610(B) in the system region 602 are used to store management data. For example, the physical units 610(A+1)-610(B) in the system region 602 may be used to store a file system, a bad block management table, and a logical to physical (L2P) mapping table. The file system may be used to record management information related to each file stored in the rewritable non-volatile memory module 43 and make a data storage mechanism of the memory storage device 10 to be compatible with that of the host system 11. For example, the file system may include a fourth extended file system (EXT4), a flash-friendly file system (F2FS) or a new technology file system (NTFS), etc., and the type of the file system is not limited thereto. The bad block management table is configured to record information of damaged physical units (i.e., bad blocks) in the rewritable non-volatile memory module 43. The L2P mapping table is configured to record mapping information. The L2P mapping information may be used to describe a mapping relationship between logical units and physical units. In addition, the physical units 610(A+1)-610(B) in the system region 602 may also be used to store other types of management information, which is not limited in the disclosure.

The memory management circuit 51 may configure logical units 612(0)-612(C) to map the physical units in the storage area 601. In an exemplary embodiment, each logical unit corresponds to a logical address. For example, one logical address may include one or multiple logical block addresses (LBA) or other logical management units. In an exemplary embodiment, one logical unit may also correspond to a logical programming unit or consist of multiple continuous or discontinuous logical addresses.

It should be noted that one logical unit may be mapped to one or multiple physical units. If a certain physical unit is currently mapped by a certain logical unit, it means that the data currently stored in the physical unit includes valid data. Conversely, if a certain physical unit is not currently mapped by any logical unit, it means that the data currently stored in the physical unit is invalid data.

In an exemplary embodiment, the memory management circuit 51 may not configure any logical unit to map the physical units in the system region 602. In this way, the management data in the system region 602 may be prevented from being accidentally modified or deleted by the user or the host system 11, thus causing the memory storage device 10 to fail to operate normally. In addition, the memory management circuit 51 may access data in the storage region 601 and the system region 602 and manage the physical units 610(0)-610(B) in the storage region 601 and the system region 602 through a flash translation layer (FTL).

In an exemplary embodiment, the memory management circuit 51 may analyze the file system stored in the system region 602 to obtain multiple logical units (which are also referred to as first logical units) to which a certain file (which is also referred to as a first file) belongs and distribution information (which is also referred to as first distribution information) of multiple physical units (which are also referred to as first physical units) in the storage region 601. The first physical units are mapped by the first logical units.

In an exemplary embodiment, the memory management circuit 51 may query information under each file directory in the file system to obtain the first logical units to which the first file belongs. In particular, the first logical units all correspond to a same file (i.e., the first file). Then, the memory management circuit 51 may query the L2P mapping table in the system region 602 to obtain the first physical units mapped to the first logical units according to the L2P mapping information in the L2P mapping table. In other words, the first physical units are used to store data (which is also referred to as first data) belonging to the first file. After determining the first physical units, the memory management circuit 51 may obtain the distribution information (i.e., first distribution information) of the first physical units.

In an exemplary embodiment, it is assumed that the first data is multiple physical nodes (which are also referred to as first physical nodes) stored in the first physical units. The first distribution information may include distribution information of the first physical nodes. For example, it is assumed that the first data includes 4 data segments, the first distribution information may indicate which physical nodes (i.e., the first physical nodes) in which physical units that these four data segments are respectively stored in.

In an exemplary embodiment, the memory management circuit 51 may determine whether to activate a data arrangement operation on the first file according to the first distribution information. For example, the memory management circuit 51 may determine whether the first distribution information meets a predetermined condition. In response to the first distribution information meeting the predetermined condition, the memory management circuit 51 may activate the data arrangement operation on the first file. Alternatively, in response to the fact that the first distribution information does not meet the predetermined condition, the memory management circuit 51 may not activate the data arrangement operation on the first file. In an exemplary embodiment, the data arrangement operation may be performed in collaboration with a garbage collection operation. In an exemplary embodiment, the data arrangement operation may also be performed alone without collaborating with the garbage collection operation.

In an exemplary embodiment, after activating the data arrangement operation on the first file, the memory management circuit 51 may instruct the rewritable non-volatile memory module 43 to read data (i.e. the first data) belonging to the first file from the first physical units. Then, the memory management circuit 51 may instruct the rewritable non-volatile memory module 43 to sequentially write the read first data into at least one physical unit (which is also referred to as a second physical unit) in the storage region 601. A total number of the first physical units may be greater than or equal to a total number of the second physical units.

In an exemplary embodiment, the data arrangement operation may be used to collectively store multiple data segments belonging to a same file (such as the first file) of the file system in multiple consecutive physical nodes. For example, it is assumed that in the first physical units, the first data is stored in multiple discontinuous physical nodes (which are also referred to as first physical nodes). In this state, the first data cannot be continuously read, resulting in poor data reading performance of the first data. After the data arrangement operation is performed on the first file, the data segments belonging to the first file may be collectively stored in multiple continuous physical nodes (which are also referred to as second physical nodes) in the second physical unit. In this state, the first data may be read continuously, thereby improving the data reading performance of the first data.

In an exemplary embodiment, the first distribution information may reflect a data dispersion of the first physical units. In an exemplary embodiment, the data dispersion of the first physical units is positively related to the total number of the first physical units. Namely, the more the total number of first physical units used to store the first data is, the higher the data dispersion of the first physical units is, and the more dispersed the storage locations of the first data are. Conversely, the less the total number of first physical units used to store the first data is, the lower the data dispersion of the first physical units is, and the more concentrated the storage locations of the first data are.

In an exemplary embodiment, the memory management circuit 51 may represent the data dispersion of the first physical units through a parameter (which is also referred to as a dispersion parameter). The memory management circuit 51 may determine whether the data dispersion (i.e., the dispersion parameter) of the first physical units is higher than a threshold value. In response to the data dispersion of the first physical units being higher than the threshold value, the memory management circuit 51 may activate a data arrangement operation on the first file, so as to collectively store the first data belonging to the first file. On the contrary, if the data dispersion of the first physical units is not higher than the threshold value, the memory management circuit 51 may not activate the data arrangement operation of the first file.

In an exemplary embodiment, even if the data arrangement operation on the first file is not activated, the garbage collection operation on the first physical units may still be performed normally. However, compared with the aforementioned data arrangement operation on the first file, the garbage collection operation on the first physical units does not deliberately store the first data belonging to the first file collectively (for example, collectively store the first data in consecutive second physical nodes). Therefore, compared with the aforementioned data arrangement operation on the first file, the conventional garbage collection operation may not help to improve the data reading efficiency of the first file.

In an exemplary embodiment, the memory management circuit 51 may analyze the file system stored in the system region 602 to obtain multiple logical units (which are also referred to as second logical units) to which another file (which is also referred to as a second file) belongs and distribution information (which is also referred to as second distribution information) of multiple physical units (which are also referred to as third physical units) in the storage region 601. In particular, the third physical units are mapped by the second logical units.

In an exemplary embodiment, the memory management circuit 51 may query information under each file directory in the file system to obtain the second logical units to which the second file belongs. Namely, the second logical units all correspond to a same file (i.e., the second file). Then, the memory management circuit 51 may query the L2P mapping table in the system region 602 to obtain the third physical units mapped to the second logical units according to the L2P mapping information in the L2P mapping table. In other words, the third physical units are used to store data (which is also referred to as second data) belonging to the second file. After determining the third physical units, the memory management circuit 51 may obtain the distribution information (i.e., second distribution information) of the third physical units. Then, the memory management circuit 51 may determine whether to activate the data arrangement operation on the first file according to the first distribution information and the second distribution information.

In an exemplary embodiment, the second distribution information may reflect a data dispersion of the second file. In an exemplary embodiment, the data dispersion of the second file is positively related to a total number of the third physical units. Namely, the more the total number of third physical units used to store the second data is, the higher the data dispersion of the second file is, and the more dispersed the storage locations of the second data are. Conversely, the less the total number of third physical units used to store the second data is, the lower the data dispersion of the second file is, and the more concentrated the storage locations of the second data are.

In an exemplary embodiment, the memory management circuit 51 may represent the data dispersion of the second file through a parameter (which is also referred to as a dispersion parameter). The memory management circuit 51 may determine whether the data dispersion of the first file is higher than the data dispersion of the second file. In response to the data dispersion of the first file being higher than the data dispersion of the second file, the memory management circuit 51 may activate a data arrangement operation on the first file, so as to collectively store the first data belonging to the first file. On the contrary, if the data dispersion of the first file is not higher than the data dispersion of the second file, the memory management circuit 51 may not activate the data arrangement operation of the first file.

In an exemplary embodiment, the memory management circuit 51 may obtain the data dispersion of each file in the file system one by one by analyzing the file system. Then, the memory management circuit 51 may preferentially perform the aforementioned data arrangement operation on the files with the highest or higher data dispersion. In this way, the subsequent data reading performance of these files may be gradually improved.

Figure 7:
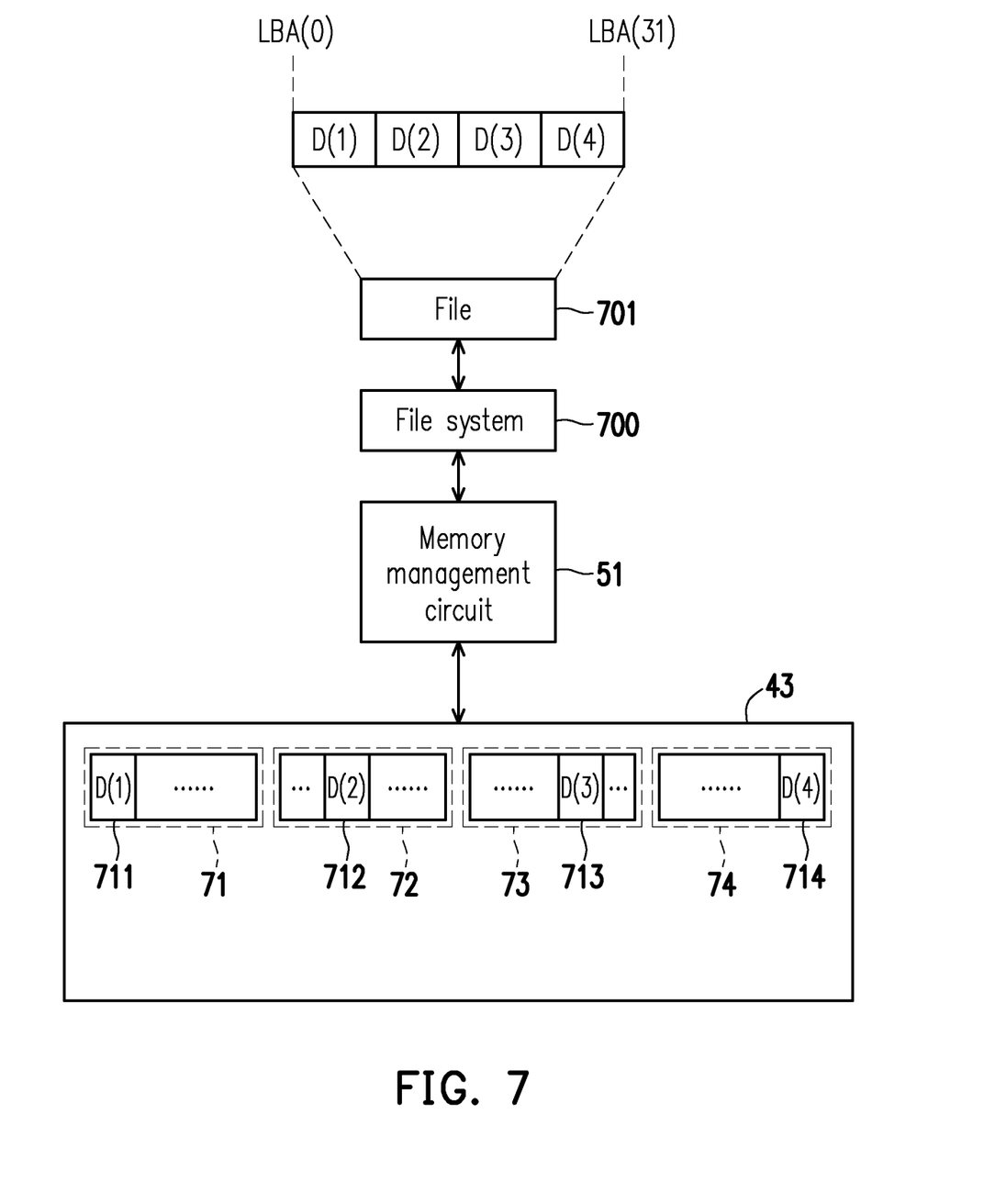
FIG. 7 is a schematic diagram of storing first data belonging to a first file to first physical units according to an exemplary embodiment of the disclosure.

FIG. 7 is a schematic diagram of storing the first data belonging to the first file to the first physical units according to an exemplary embodiment of the disclosure.

Referring to FIG. 7, it is assumed that data segments D(1)-D(4) (i.e. the first data) in a file 701 (i.e. the first file) belong to logical units LBA(0)-LBA(31) (i.e. the first logical units). After querying and analyzing the file system 700, the memory management circuit 51 may obtain distribution information of physical units 71-74 (i.e. the first physical units) mapped by the logical units LBA(0)-LBA(31). In an exemplary embodiment, the distribution information may reflect that the data segments D(1)-D(4) are stored in the physical units 71-74. In an example embodiment, the distribution information may also reflect that the data segments D(1)-D(4) are stored in physical nodes 711-714 (i.e., the first physical nodes). It should be noted that in the example embodiment of FIG. 7, the physical nodes 711-714 are not continuous physical nodes.

Figure 8:
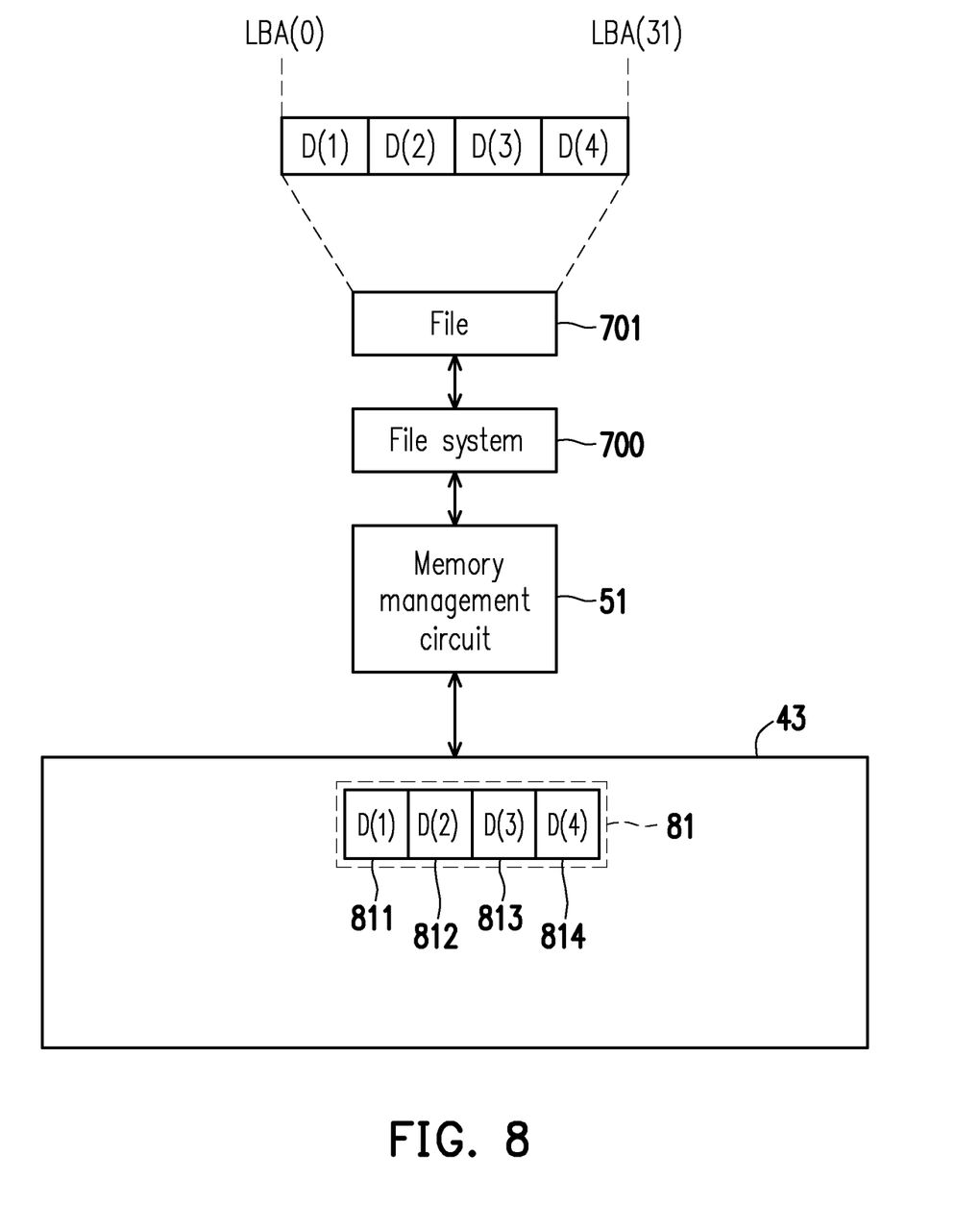
FIG. 8 is a schematic diagram of sequentially writing the first data belonging to the first file to a second physical unit according to an exemplary embodiment of the disclosure.

FIG. 8 is a schematic diagram of sequentially writing the first data belonging to the first file to the second physical unit according to an exemplary embodiment of the disclosure.

Referring to FIG. 8, continuing the exemplary embodiment of FIG. 7, after activating the data arrangement operation on the file 701, in the data arrangement operation, the data segments D(1)-D(4) belonging to the file 701 may be read from the physical units 71-74 (or the physical nodes 711-714) and re-stored to physical nodes 811-814 (i.e., second physical nodes) in a physical unit 81 (i.e., the second physical unit). In particular, compared with the physical nodes 711-714, the physical nodes 811-814 are (or include) continuous physical nodes.

It should be noted that, in the exemplary embodiment shown in FIG. 7, the data segments D(1)-D(4) are distributed and stored in four physical units 71-74. Therefore, when the data in the file 701 is to be read, all of the physical units 71-74 need to be read to obtain the data segments D(1)-D(4). It is Assumed that a time required for reading one physical unit is 60 microseconds (μs). In the exemplary embodiment of FIG. 7, it may take 240 microseconds to continuously read the data segments D(1)-D(4) from the physical units 71-74.

However, in the exemplary embodiment shown in FIG. 8, the data segments D(1)-D(4) are collectively stored in one physical unit 81 after arrangement. Therefore, when it is required to read the data in the file 701, it only needs to read the physical unit 81 to obtain the data segments D(1)-D(4). Compared with the exemplary embodiment of FIG. 7, in the exemplary embodiment of FIG. 8, it may only take ¼ of the time (i.e., 60 microseconds) to read the data segments D(1)-D(4) from the physical unit 81. Therefore, after the data arrangement operation is performed on the file 701, the reading performance of the file 701 may be effectively improved.

It should be noted that the data storage methods shown in FIG. 7 and FIG. 8 are just examples and are not used to limit the disclosure. In another exemplary embodiment, a total number (and distribution) of the first logical units, a total number (and distribution) of the first physical units, a total number (and distribution) of the first physical nodes, a total number (and distribution) of the second physical units, and a total number (and distribution) of the second physical nodes may be adjusted according to practical requirements, and are not limited by the disclosure.

Figure 9:
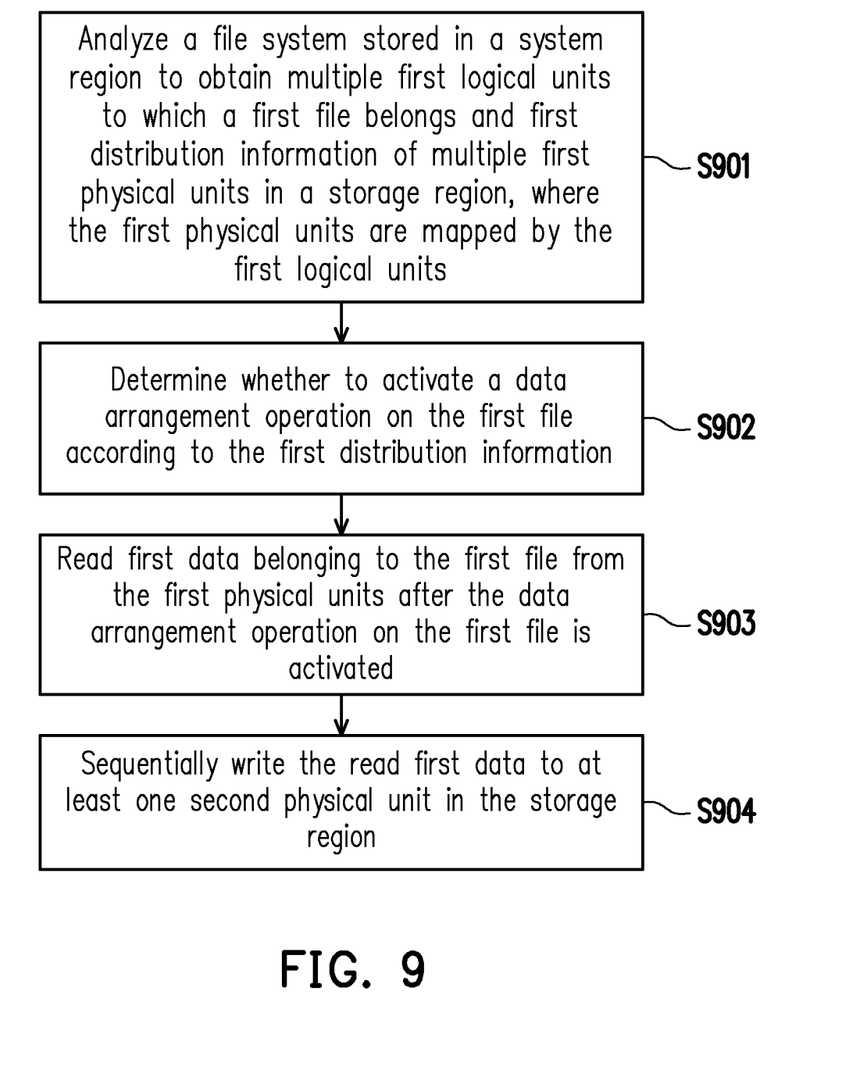
FIG. 9 is a flowchart of a data arrangement method based on file system according to an exemplary embodiment of the disclosure.

FIG. 9 is a flowchart of a data arrangement method based on file system according to an exemplary embodiment of the disclosure.

Referring to FIG. 9, in step S901, a file system stored in a system region is analyzed to obtain multiple first logical units to which a first file belongs and first distribution information of multiple first physical units in a storage region, where the first physical units are mapped by the first logical units. In step S902, it is determined whether to activate a data arrangement operation on the first file according to the first distribution information. In step S903, after the data arrangement operation on the first file is activated, first data belonging to the first file is read from the first physical units. In step S904, the read first data is sequentially written to at least one second physical unit in the storage region.

However, each step in FIG. 9 has been described in detail above, which will not be repeated here. It should be noted that each step in FIG. 9 may be implemented as multiple codes or circuits, which is not limited by the disclosure. In addition, the method in FIG. 9 may be used in collaboration with the above exemplary embodiments, or may be used alone, which is not limited by the disclosure.

In summary, in the data arrangement method based on file system, the memory storage device and the memory control circuit unit provided by the exemplary embodiment of the disclosure, multiple data segments belonging to the same file may be collectively stored by analyzing the file system stored in the system region. In this way, the subsequent data reading performance of the file may be improved.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. A data arrangement method based on file system, adapted to a rewritable non-volatile memory module, the rewritable non-volatile memory module comprising a system region and a storage region, and the data arrangement method comprising:
   analyzing a file system stored in the system region to obtain a plurality of first logical units to which a first file belongs and first distribution information of a plurality of first physical units in the storage region, wherein the first physical units are mapped by the first logical units;
   determining whether to activate a data arrangement operation on the first file according to the first distribution information;
   reading first data belonging to the first file from the first physical units after the data arrangement operation on the first file is activated; and
   sequentially writing the read first data to at least one second physical unit in the storage region.

2. The data arrangement method according to claim 1, wherein the first distribution information reflects a data dispersion of the first file, and determining whether to activate the data arrangement operation on the first file according to the first distribution information comprises:
   activating the data arrangement operation on the first file according to the data dispersion of the first file.

3. The data arrangement method according to claim 1, wherein determining whether to activate the data arrangement operation on the first file according to the first distribution information comprises:
   analyzing the file system stored in the system region to obtain a plurality of second logical units to which a second file belongs and second distribution information of a plurality of third physical units in the storage region, wherein the third physical units are mapped by the second logical units; and
   determining whether to activate the data arrangement operation on the first file according to the first distribution information and the second distribution information.

4. The data arrangement method according to claim 3, wherein the first distribution information reflects a data dispersion of the first file, and the second distribution information reflects a data dispersion of the second file, and determining whether to activate the data arrangement operation on the first file according to the first distribution information and the second distribution information comprises:
   activating the data arrangement operation on the first file according to the data dispersion of the first file and the data dispersion of the second file.

5. The data arrangement method according to claim 1, wherein a total number of the first physical units is greater than a total number of the at least one second physical unit.

6. The data arrangement method according to claim 1, wherein in the first physical units, the first data is stored in a plurality of discontinuous first physical nodes, and
   in the at least one second physical unit, the first data is stored in a plurality of consecutive second physical nodes.

7. The data arrangement method according to claim 1, wherein the data arrangement operation is configured to collectively store a plurality of data segments belonging to a same file in the file system in a plurality of consecutive physical nodes.

8. A memory storage device, comprising:
   a connection interface unit, configured to couple to a host system;
   a rewritable non-volatile memory module, comprising a system region and a storage region; and
   a memory control circuit unit, coupled to the connection interface unit and the rewritable non-volatile memory module,
   wherein the memory control circuit unit is used for:
   analyzing a file system stored in the system region to obtain a plurality of first logical units to which a first file belongs and first distribution information of a plurality of first physical units in the storage region, wherein the first physical units are mapped by the first logical units;

determining whether to activate a data arrangement operation on the first file according to the first distribution information;

reading first data belonging to the first file from the first physical units after the data arrangement operation on the first file is activated; and sequentially writing the read first data to at least one second physical unit in the storage region.

9. The memory storage device according to claim 8, wherein the first distribution information reflects a data dispersion of the first file, and determining whether to activate the data arrangement operation on the first file according to the first distribution information comprises:

activating the data arrangement operation on the first file according to the data dispersion of the first file.

10. The memory storage device according to claim 8, wherein determining whether to activate the data arrangement operation on the first file according to the first distribution information comprises:

analyzing the file system stored in the system region to obtain a plurality of second logical units to which a second file belongs and second distribution information of a plurality of third physical units in the storage region, wherein the third physical units are mapped by the second logical units; and determining whether to activate the data arrangement operation on the first file according to the first distribution information and the second distribution information.

11. The memory storage device according to claim 10, wherein the first distribution information reflects a data dispersion of the first file, and the second distribution information reflects a data dispersion of the second file, and determining whether to activate the data arrangement operation on the first file according to the first distribution information and the second distribution information comprises:

activating the data arrangement operation on the first file according to the data dispersion of the first file and the data dispersion of the second file.

12. The memory storage device according to claim 8, wherein a total number of the first physical units is greater than a total number of the at least one second physical unit.

13. The memory storage device according to claim 8, wherein in the first physical units, the first data is stored in a plurality of discontinuous first physical nodes, and in the at least one second physical unit, the first data is stored in a plurality of consecutive second physical nodes.

14. The memory storage device according to claim 8, wherein the data arrangement operation is configured to collectively store a plurality of data segments belonging to a same file in the file system in a plurality of consecutive physical nodes.

15. A memory control circuit unit, configured to control a rewritable non-volatile memory module, the rewritable non-volatile memory module comprising a system region and a storage region, and the memory control circuit unit comprising:

a host interface, configured to couple to a host system;

a memory interface, configured to couple to the rewritable non-volatile memory module; and a memory management circuit, coupled to the host interface and the memory interface, wherein the memory management circuit is used for:

analyzing a file system stored in the system region to obtain a plurality of first logical units to which a first file belongs and first distribution information of a plurality of first physical units in the storage region, wherein the first physical units are mapped by the first logical units;

determining whether to activate a data arrangement operation on the first file according to the first distribution information;

reading first data belonging to the first file from the first physical units after the data arrangement operation on the first file is activated; and sequentially writing the read first data to at least one second physical unit in the storage region.

16. The memory control circuit unit according to claim 15, wherein the first distribution information reflects a data dispersion of the first file, and determining by the memory management circuit whether to activate the data arrangement operation on the first file according to the first distribution information comprises:

activating the data arrangement operation on the first file according to the data dispersion of the first file.

17. The memory control circuit unit according to claim 15, wherein determining by the memory management circuit whether to activate the data arrangement operation on the first file according to the first distribution information comprises:

analyzing the file system stored in the system region to obtain a plurality of second logical units to which a second file belongs and second distribution information of a plurality of third physical units in the storage region, wherein the third physical units are mapped by the second logical units; and determining whether to activate the data arrangement operation on the first file according to the first distribution information and the second distribution information.

18. The memory control circuit unit according to claim 17, wherein the first distribution information reflects a data dispersion of the first file, and the second distribution information reflects a data dispersion of the second file, and determining by the memory management circuit whether to activate the data arrangement operation on the first file according to the first distribution information and the second distribution information comprises:

activating the data arrangement operation on the first file according to the data dispersion of the first file and the data dispersion of the second file.

19. The memory control circuit unit according to claim 15, wherein a total number of the first physical units is greater than a total number of the at least one second physical unit.

20. The memory control circuit unit according to claim 15, wherein in the first physical units, the first data is stored in a plurality of discontinuous first physical nodes, and in the at least one second physical unit, the first data is stored in a plurality of consecutive second physical nodes.

21. The memory control circuit unit according to claim 15, wherein the data arrangement operation is configured to collectively store a plurality of data segments belonging to a same file in the file system in a plurality of consecutive physical nodes.

* * * * *